United States Patent

[11] 3,602,357

[72] Inventor Bernhard Schubert
 Schaferholz, Germany
[21] Appl. No. 802,463
[22] Filed Feb. 26, 1969
[45] Patented Aug. 31, 1971
[73] Assignee Hauni-Werke Korber & Co. K.G.
 Hamburg-Bergedorf, Germany
[32] Priority Mar. 1, 1968, Dec. 3, 1968
[33] Great Britain
[31] 10047/68 and 57341/68

[54] APPARATUS FOR TRANSPORTING ROD-SHAPED ARTICLES
 20 Claims, 14 Drawing Figs.
[52] U.S. Cl...................................... 198/31 AA,
 198/20 C
[51] Int. Cl....................................... B65g 47/26
[50] Field of Search........................... 198/31 A,
 20 C, 25

[56] References Cited
 UNITED STATES PATENTS
3,039,590 6/1962 Best.............................. 198/31 A 1

Primary Examiner—Evon C. Blunk
Assistant Examiner—Alfred N. Goodman
Attorney—Michael S. Striker ABSTRACT: Apparatus for converting a single row of cigarettes, filter rod sections or like rod-shaped articles into one or more files of articles which move sideways comprises a rotary drum having flutes which are sealed from the atmosphere during travel past and beyond the station where the articles of the row enter successive flutes. The articles in the flutes are braked by mechanical or pneumatic means to come to rest in first regions of the respective flutes and are thereupon shifted lengthwise by pneumatic means, in and/or counter to the direction of travel during entry into the flutes, to assume final positions in which they form one or more files of articles moving sideways.

INVENTOR
BERNHARD SCHUBERT
BY Michael S. Striker
ATTORNEY

INVENTOR
BERNHARD SCHUBERT
BY Michael S. Striker
ATTORNEY

INVENTOR
BERNHARD SCHUBERT

BY Michael S. Geedee
ATTORNEY

APPARATUS FOR TRANSPORTING ROD-SHAPED ARTICLES

BACKGROUND OF THE INVENTION

The present invention relates to apparatus for transporting rod-shaped articles, particularly for transporting filter rod sections, plain or filter-tipped cigarettes, cigarillos, cigars or the like.

Modern rod cigarette machines or machines for the production of filter rod sections are capable of producing thousands of rod-shaped articles per minute. However, such high-speed machines cannot be utilized to capacity because it is difficult to accept and properly transport and array articles which are delivered at the rate of several thousand per minute. As a rule, articles which move lengthwise beyond the cutoff of a rod cigarette machine or filter rod machine are thereupon moved sideways and arranged in one or more files of parallel articles. In many presently known transporting apparatus which accept cigarettes or filter rod sections from cutoffs, the articles are caused to strike against stops and to thus terminate their lengthwise movement. Such procedure is unsatisfactory when the articles are fed at a very high speed because the leading ends of articles are likely to be deformed or damaged on impact against the stops. Additional problems arise when a rod cigarette machine or filter rod machine is started because the articles are then delivered at an unpredictable speed which often varies within a wide range.

It is already known to feed rod-shaped articles which move beyond the cutoff of a rod cigarette machine or filter rod machine into flutes of a revolving drum wherein the articles are braked and held in predetermined positions by suction. Such solution is satisfactory if the articles are not supplied at a high speed; otherwise, suction must be increased to such an extent that the wrappers of articles are likely to become damaged due to friction between wrapper material and the surfaces surrounding the flutes of the transporting drum, or the drum must be provided with very long flutes to insure that rapidly moving articles can be decelerated gradually before reaching the remote ends of their flutes. Furthermore, it was found that such pneumatic braking action is unreliable because the ultimate positions of braked articles cannot be determined in advance with a desired degree of accuracy.

Pat. No. 3,039,590 to Best proposes to mechanically brake cigarettes or filter rods in the flutes of a revolving drum in such a way that the articles come to rest prior to reaching their desired final positions. The thus arrested articles are thereupon moved by pneumatic means to engage mechanical stops in the respective flutes. Mechanical braking action is often unsatisfactory because the wrappers of articles are apt to be damaged, defaced or destroyed. Moreover, the ends of articles are still likely to be damaged or deformed when they strike against the respective mechanical stops.

SUMMARY OF THE INVENTION

An object of my invention is to provide a transporting apparatus for filter rod sections, cigarettes or analogous rod-shaped articles which does not exhibit the drawbacks of aforementioned conventional apparatus and which is capable of receiving, transporting and arraying rod-shaped articles at a rate exceeding the rate at which such articles can be safely manipulated in presently known apparatus.

Another object of the invention is to provide a transporting apparatus which can convert a row of coaxial rod-shaped articles into one or more files of articles which move sideways in such a way that the devices which effect changes in the direction of movement of articles need not include any mechanical stops.

A further object of the invention is to provide a transporting apparatus whose operation is not affected by fluctuations in the rate at which it receives filter rod sections, cigarettes or analogous articles.

An additional object of the invention is to provide an apparatus which can be combined with or incorporated in presently known rod cigarette machines, filter rod making machines or analogous machines for the production of rod-shaped articles which constitute, or form component parts of, smoking products.

In one of its presently preferred forms, the improved apparatus comprises conveyor means (preferably a drum which is rotated about a horizontal axis) having elongated flutes, pockets or analogous holders which move sideways, guide means (for example, a trough which receives articles from the cutoff of a rod cigarette machine or filter rod machine) for directing articles lengthwise into the flutes, control means (preferably including pneumatic or mechanical braking means) for regulating movements of articles lengthwise of the flutes in a given direction so as to insure that the articles come to rest in first predetermined regions of respective flutes, and displacing means (preferably including means for producing in the flutes currents of air) for thereupon moving the articles lengthwise of the flutes counter to the aforementioned given direction to locate such articles in second predetermined regions of respective flutes. Such mode of operation insures that the articles can travel along substantial portions of flutes during movement toward their positions of rest in the first regions of corresponding flutes so that the articles can be braked gradually without damage to their wrappers and/or filters.

In accordance with another presently preferred embodiment of my invention, the conveyor means cooperates with sealing means for at least substantially sealing the flutes from the atmosphere while the flutes accommodate rod-shaped articles. The displacing means is designed to move articles from first to second regions of the respective flutes by suction and in the same direction in which the articles move during travel toward their positions of rest. The control means of such modified apparatus may comprise mechanical or pneumatic braking means for articles which enter the flutes at the station accommodating the guide means and leave the flutes at a second station at which they form one or more files of articles which move sideways.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
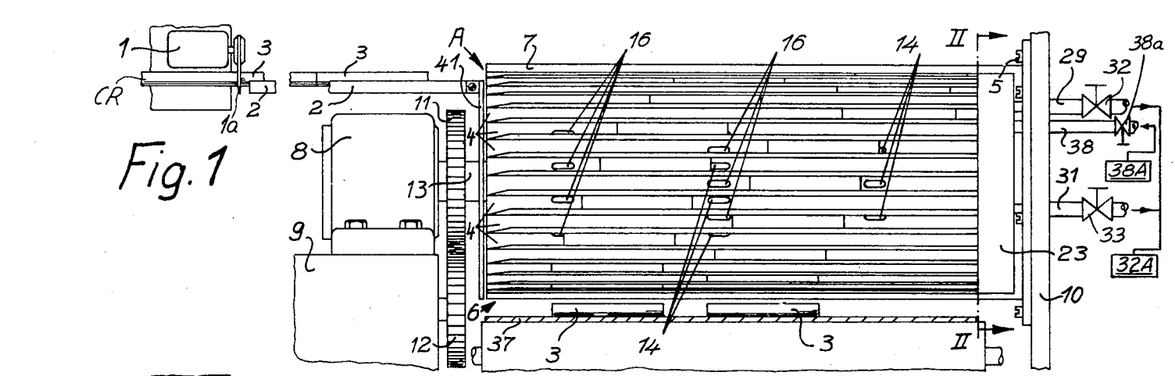
FIG. 1 is a side elevational view of a transporting apparatus for plain cigarettes which embodies one form of my invention.
Figure 2:
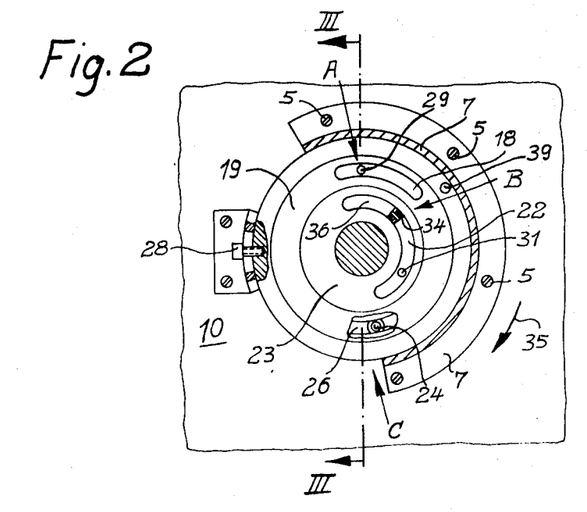
FIG. 2 is a transverse vertical sectional view as seen in the direction of arrows from the line II-II of FIG. 1.
Figure 3:
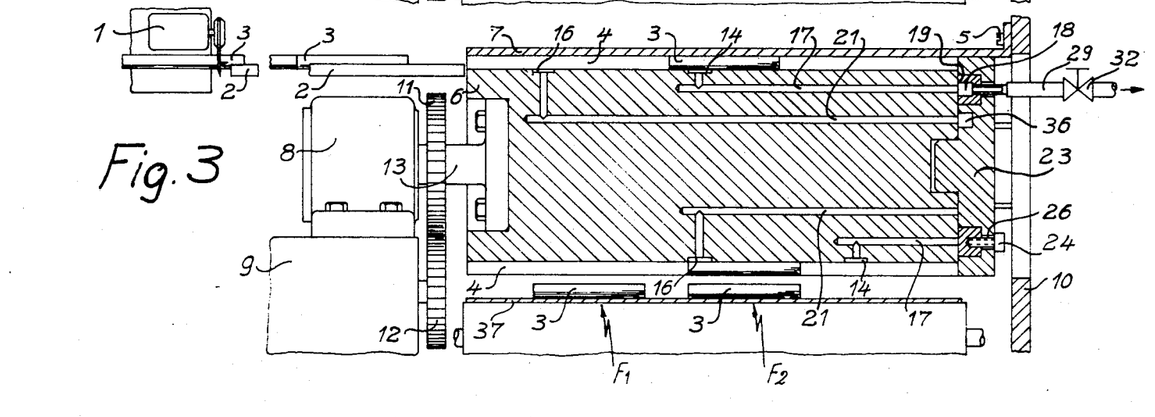
FIG. 3 is a longitudinal vertical sectional view as seen in the direction of arrows from the line III-III of FIG. 2.

FIGS. 1 to 3 illustrate an apparatus which transports plain cigarettes 3 of unit length in such a way that a single row of cigarettes which travel along a straight path defined by a trough-shaped guide 2 is converted into two files F1, F2 of cigarettes which travel sideways with the upper stretch of an endless belt 37 which can form part of an assembly conveyor wherein the cigarettes are assembled with filter rod sections of double unit length to form therewith groups of rod-shaped articles ready to be provided with wrappers and to be thus converted into filter cigarettes of double unit length. The machine which supplies cigarettes 3 to the guide 2 is a rod cigarette machine of known design which includes a conventional cutoff 1 having an orbiting knife 1a which severs a continuous wrapped cigarette rod CR at predetermined intervals to form a succession of cigarettes 3.

The transporting apparatus includes the aforementioned trough 2 and further comprises a conveyor 6, here shown as a drum, which is rotatable about a horizontal axis and is rotated by a drive whose operation is synchronized with that of the cutoff 1. The peripheral surface of the drum 6 is formed with axially parallel equidistant flutes 4 and a portion of such peripheral surface is surrounded by a sealing member or shroud 7 of transparent or translucent plastic material which insures that some of the flutes are at least substantially sealed from the surrounding atmosphere. The shroud 7 is secured by screws 5 or analogous fasteners to an upright wall 10 which forms part of the frame of the rod cigarette machine. As shown in FIG. 2, the shroud 7 extends along the periphery of the drum 6 from a point located slightly ahead of a receiving station A where the trough 2 delivers cigarettes 3 into successive flutes 4 and to a point located at least slightly ahead of a discharging station C where the cigarettes leave the flutes 4 and descend onto the supper stretch of the belt 37.

The drive means for rotating the drum 6 in synchronism with the cutoff 1 comprises a shaft 13 which is rotatable in a stationary bearing 8 and is driven by a transmission receiving motion from the main drive shaft of the rod cigarette machine. The transmission comprises a driven gear 11 on the shaft 13 and a driver gear 12 which mates with the gear 11 and is driven by a shaft journaled in a transmission case 9.

In accordance with a feature of the present invention, the transporting apparatus further comprises a control unit which includes a braking device serving to terminate lengthwise movement of cigarettes 3 which enter successive flutes 4 so that such cigarettes come to rest before they reach their final positions. This braking device insures that each cigarette 3 comes to rest in a first predetermined region of the respective flute, i.e., that a cigarette 3 which is delivered by the trough 2 and moves in a direction from the left to the right, as viewed in FIG. 1 or 3, comes to rest in a preselected region of its flute, preferably well ahead of the discharging station C so that a displacing unit of the transporting apparatus has ample time to shift the cigarette lengthwise in a direction from the right to the left and to locate such cigarette in a second predetermined region of the corresponding flute 4 not later than at the time when the thus located cigarette reaches the discharging station.

In the embodiment of FIGS. 1 to 3, the braking device of the control unit is a pneumatic braking device and is designed to produce currents of air which are drawn by suction into openings 14 provided in the drum 6 and communicating with the corresponding flutes 4. It is clear that each opening 14 may be replaced by two or more smaller openings, as long as these openings can convey currents of air at the rate which is necessary to insure that the cigarettes 3 come to rest in the aforementioned first predetermined regions of their flutes. Since the transporting apparatus of FIGS. 1 to 3 is designed to form two files F1 and F2 of parallel cigarettes, the openings 14 of the drum 6 are arranged in two annular groups the first of which is located substantially midway between the axial ends of the drum and the second of which is adjacent to the right-hand end of the drum, as viewed in FIG. 1 or 3. The arrangement is such that flutes 4 communicating with centrally located openings 14 alternate with flutes which communicate with the openings 14 of the second group.

The aforementioned displacing unit of the transporting apparatus is a pneumatically operated unit and comprises a device which produces currents of air flowing from the flutes 4 into apertures or ports 16 provided in the drum 6. Each port 16 communicates with one of the flutes 4 and is located to the left of the corresponding opening 14, as viewed in FIG. 1 or 3. These ports also form two groups including a first group which is adjacent to the left-hand axial end of the drum 6 and whose ports communicate with flutes communicating with the openings 14 of the first group, and a second group which is located substantially midway between the axial ends of the drum and whose ports 16 communicate with flutes which are in communication with the openings 14 of the second group. The upper part of FIG. 3 shows a flute 4 which communicates with a port 16 of the first group of ports and with an opening 14 of the first group of openings. The lower part of FIG. 3 shows a flute 4 which communicates with a port 16 of the second group of ports and with an opening 14 of the second group of openings.

The braking device and the displacing unit may but need not comprise common parts. As shown in FIG. 3, the drum 6 is provided with axially parallel bores or channels 17 which extend to its right-hand end face and each of which communicates with one of the openings 14, and with bores or channels 21 which also extend to its right-hand end face and each of which communicates with one of the ports 16. A stationary ring-shaped valve plate 19 has a left-hand end face which is formed with an arcuate groove 18 and is biased against the right-hand end face of the drum 6. The right-hand ends of successive channels 17 communicate with the groove 18 when the shaft 13 is driven by the transmission to rotate the drum 6 in a clockwise direction (arrow 35 in FIG. 2). A disk-shaped second stationary valve plate 23 is also biased against the right-hand end face of the drum 6 and is provided with an arcuate groove 22 which communicates with successive channels 21 when the shaft 13 rotates. The valve plate 19 is rotatable in an annular recess of the valve plate 23 and is adjustably secured thereto by a screw 24 whose stem extends through an arcuate slot 26 of the valve plate 23. The screw 24 serves as a means for selecting the length of intervals during which the cigarettes entering at the receiving station A are subjected to the braking action or air currents flowing into the corresponding openings 14. Also, the screw 24 permits angular adjustment of the valve plate 23 with reference to the valve plate 19 to thereby determine the length of intervals during which the displacing unit creates air currents which shift and locate cigarettes in the second predetermined regions of the corresponding flutes 4. Once the angular position of the valve plate 23 is selected by the operator, this plate is fixed to the wall 10 by a screw 28 (FIG. 2) or the like. The peripheral surface of the valve plate 23 can be provided with several tapped bores for the stem of the screw 28. Spring-biased detent means can be used as a substitute for the screw 28.

The common current producing means of the braking device and displacing unit comprises conduits 29, 31 which are respectively connected to the valve plates 19 and 23 and evacuate air from the grooves 18, 22. These conduits respectively accommodate adjustable throttle valves 32 and 33 and are connected to a fan 32A or an analogous suction generating device. That end face of the valve plate 23 which bears against the adjoining end face of the drum 6 is further provided with an arcuate groove 36 which is an extension of the aforementioned groove 22 and communicates therewith by way of a flow restrictor 34.

FIG. 2 shows that the rear end of the arcuate groove 18 in the valve plate 19 is located ahead of the front end of the groove 22, as considered in the direction of rotation of the drum 6 (arrow 35). Thus, the braking device ceases to draw a current of air from a flute 4 (by way of the respective opening 14) when the displacing unit begins to produce a current of air which flows through the port 16 of the same flute and causes the cigarette 3 to move lengthwise from the first to the second region of the respective flute. The operator can adjust the intensity of braking action by way of the valve 32. As stated before, the operator can also select the duration of that interval during which the cigarette entering a flute 4 at the receiving station A is subjected to a braking action; this can be achieved by changing the angular position of the valve plate 19 with reference to the stationary trough 2. The valve plate 19 can be adjusted in or counter to the direction indicated by arrow 35.

The valve plate 23 is further provided with an orifice 39 (FIG. 2) which is located past the rear end of the groove 18 and is connected to a conduit 38 which is connected to a compressor 38A or another source of compressed air and contains an adjustable pressure regulating valve 38a. The orifice 39 registers with successive flutes 4 when the drum 6 rotates.

A second sealing member in the form of a plate 41 is secured to the trough 2 and seals or substantially seals the left-hand ends of the flutes 4, as viewed in FIG. 1. The plate 41 can seal the ends of all those flutes 4 which move beyond the receiving station A and advance toward and past the discharging station C. This plate enhances the operation of the control unit and displacing unit because the fan 32A can rapidly evacuate air from those flutes which advance from the station A toward the station C.

The operation:

The knife 1a of the cutoff 1 severs the cigarette rod CR so that the latter yields a succession of discrete cigarettes 3 which advance in the trough 2 toward the receiving station A and enter successive flutes 4 of the revolving drum 6. Each flute 4 which reaches the receiving station A is substantially sealed from the atmosphere (shroud 7) and the pressure therein is below atmospheric pressure because the corresponding opening 14 is connected with the groove 18 of the valve plate 19 by the respective channel 17. Therefore, the cigarettes 3 which approach the station A are accelerated by currents of air which are drawn into the left-hand ends of flutes 4. However, it is equally within the purview of my invention to employ a customary accelerator (such as the eccentric cam 525 of FIG. 11) which can assist the control unit by accelerating cigarettes in the trough 2.

Each cigarette 3 which enters the corresponding flute 4 is caused to advance beyond its final position (second predetermined region of the flute) and is braked or decelerated when its wrapper begins to overlie the corresponding opening 14 which then communicates with the groove 18 of the valve member 19. The air current which is drawn into the opening 14 increases friction between the wrapper of the cigarette 3 and the surface surrounding the respective flute so that the cigarette ultimately comes to a stop not later than at the station B shown in FIG. 2, namely, when the corresponding channel 17 reaches the rear end of the groove 18. The position of the thus arrested cigarette need not be an accurately determined position, i.e., the length of the first predetermined region of each flute can exceed the length of a cigarette 3, as long as the cigarette is then located to the right of the corresponding port 16. When the channel 17 moves beyond the groove 18 of the valve member 19 (station B), the corresponding channel 21 begins to communicate with the groove 22 of the valve member 23 (see FIG. 2) so that the port 16 draws a current of air which causes the cigarette 3 to move in a direction to the left, as viewed in FIG. 1 or 3, and to come to rest when it reaches the second predetermined region of the corresponding flute 4 (namely, when it is aligned with the cigarettes of the file F1 or F2). The purpose of the orifice 39 in the valve plate 23 is to discharge a stream of compressed air which assists the currents of air flowing into the ports 16 in initiating the leftward axial movement of cigarettes 3 toward their final positions. The provision of such orifice is of particular advantage when the drum 6 rotates at a high speed so that the interval allotted for travel of a flute 4 from the station B to the station C is very short. The aforementioned second sealing member 41 insures that the fan 32A can rapidly evacuate air from a flute 4 while the latter moves past the groove 18 or 22. The purpose of the aforementioned second groove 36 in the end face of the valve member 23 is to create in the ports 16 some suction while the cigarettes advance beyond the ports 16 under the action of air currents which flow into the corresponding openings 14, i.e., while the corresponding channels 17 register with the groove 18 of the valve plate 19. Slight suction in the ports 16 during travel of cigarettes into the first regions of corresponding flutes assists the braking action of the control unit. It will be seen that, due to the provision of groove 36, a cigarette 3 is braked all the way from the time its wrapper reaches the corresponding port 16 and all the way to the moment when it comes to rest in the first region of the respective flute. The size of the passage in the flow restrictor 34 determines the magnitude of suction in the groove 36.

When a flute 4 reaches the discharging station C, the cigarette 3 therein is aligned with the file F1 or F2 and is free to descend by gravity as well as under the action of centrifugal force so that it comes to rest on the upper stretch of the travelling belt 37. The shroud 7 terminates ahead of the discharging station C so that it cannot interfere with transfer of cigarettes onto the belt 37. The groove 22 also terminates ahead of the discharging station C. It is clear that the belt 37 can be replaced by a fluted drum or by a chain whose links carry pockets or holders for cigarettes and which is driven in synchronism with the drum 6.

Figure 4:
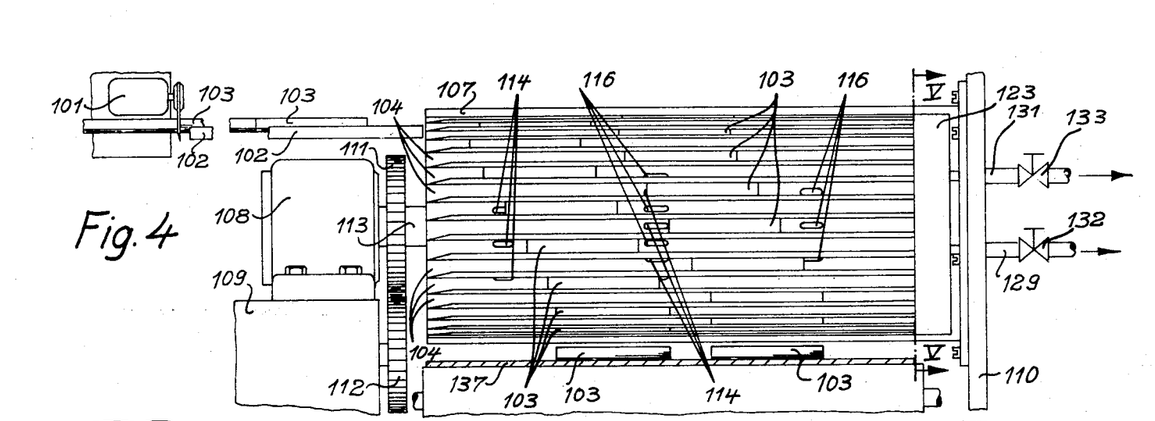
FIG. 4 is a side elevational view of a second transporting apparatus.
Figure 5:
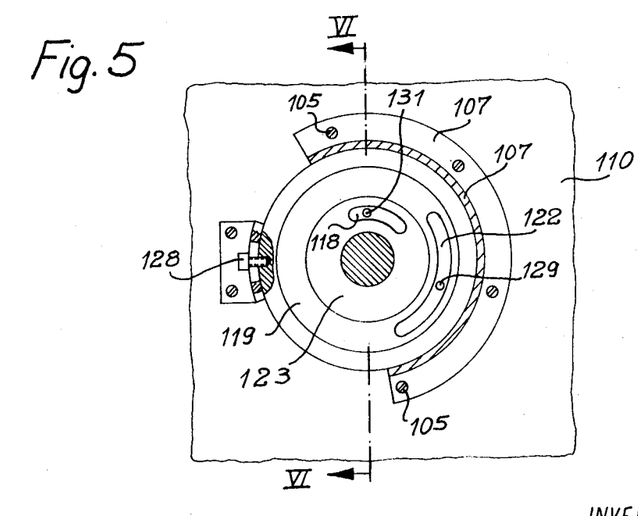
FIG. 5 is a transverse vertical sectional view as seen in the direction of arrows from the line V-V of FIG. 4.
Figure 6:
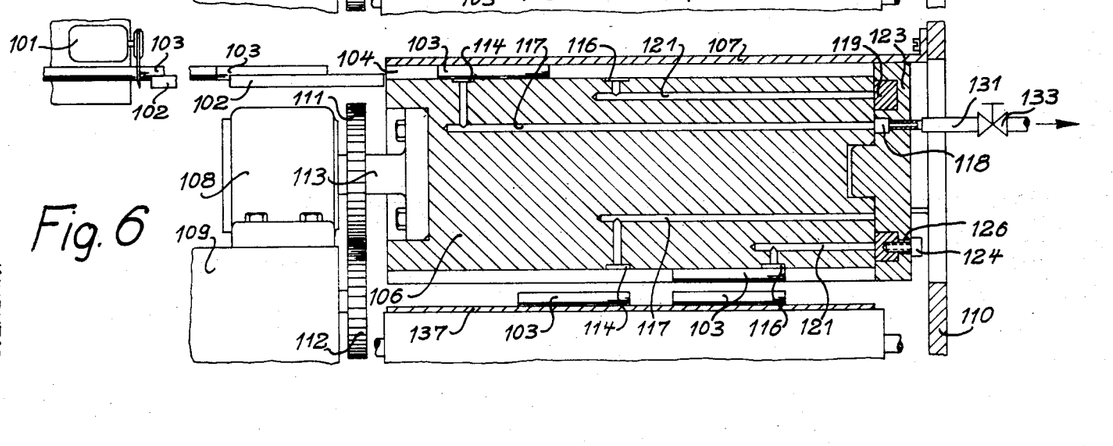
FIG. 6 is a longitudinal vertical sectional view as seen in the direction of arrows from the line VI-VI of FIG. 5.

FIGS. 4 to 6 illustrate a second apparatus which differs from the just described apparatus in that all of the cigarettes 103 come to rest before they reach their final positions and are thereupon displaced in the same direction in which they advance from the guide trough 102 into the first predetermined regions of the respective flutes 104. All such parts of this apparatus which are clearly analogous to or identical with the corresponding parts of the apparatus shown in FIGS. 1 to 3 are denoted by similar reference characters plus 100. It can be said that the positions of openings and ports of FIGS. 1 to 3 are reversed in the apparatus of FIGS. 4–6.

As best shown in FIGS. 4 and 6, the openings 114 which receive currents of air produced by the pneumatic braking device of the control unit are disposed in two groups including a first group adjacent to the left-hand axial end of the drum 106 and a second group located substantially midway between the ends of the drum. The ports 116 also form two groups the first of which is located substantially midway between the axial ends of the drum 106 and the second of which is adjacent to the right-hand axial end of the drum. Each port 116 of the first group of ports communicates with a flute 104 which also communicates with an opening 114 of the first group of openings, and each port 116 of the second group of ports communicates with a flute which also communicates with an opening 114 of the second group. The openings or ports of the first group alternate with openings or ports of the second group. As shown in FIG. 5, the arcuate groove 118 is provided in the valve plate 123 and the arcuate groove 122 is provided in the valve plate 119. The current producing means of the braking device comprises the suction conduit 131 which is connected to the fan (not shown) and evacuates air from the groove 118 in the valve plate 123 to insure that each cigarette 103 comes to rest in the first region of the respective flute 104 before the corresponding channel or bore 121 begins to communicate with the groove 116 which is in communication with the passage of the suction conduit 129 forming part of the displacing units.

The operation of the apparatus shown in FIGS. 4–6 is analogous to that of the first apparatus. The main difference is that each cigarette 103 comes to rest in a region located between the left-hand axial end of the drum 106 (as viewed in FIG. 4 or 6) and the second predetermined region of the respective flute, i.e., that the pneumatic displacing unit effects rightward movement of each cigarette 103.

Figure 7:
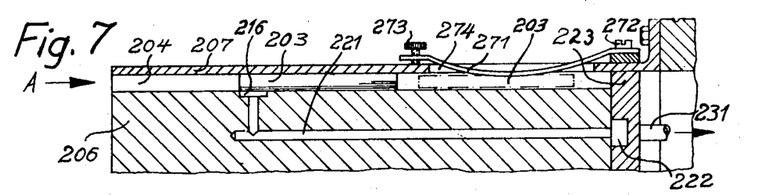
FIG. 7 is a fragmentary longitudinal vertical sectional view of a third transporting apparatus.

FIG. 7 shows a portion of a third transporting apparatus wherein the pneumatic braking device of FIGS. 1 to 3 is replaced by a mechanical braking device including an adjustable leaf spring 271. Those parts of the apparatus of FIG. 7 which are clearly analogous to the corresponding parts of the apparatus shown in FIGS. 1 to 3 are denoted by similar reference characters plus 200.

One end of the leaf spring 271 is secured to the shroud 207 by one or more screws 272 and its other end meshes with the threaded stem of an adjusting screw 273 whose tip bears against the outer side of the shroud. The latter has an elongated window 274 for the curved median portion of the leaf spring 271. This median portion has a convex underside which extends into the adjoining flute 204 of the drum 206. The ribs between adjoining flutes 204 are preferably provided with suitable cutouts to insure that the median portion of the spring 271 cannot interfere with rotary movement of the drum 206. The displacing unit of the apparatus including the structure of FIG. 7 comprises a pneumatic device which draws currents of air through ports 216 in the surfaces surrounding the flutes 204. The ports 216 are located ahead of the braking spring 271 and are disconnected from the suction conduit 231 while the cigarettes 203 entering at receiving station A travel toward and into engagement with the spring 271. The conduit 231 of the displacing unit is in communication with the groove 222 of the valve plate 223 which bears against the right-hand end face of the drum 206.

The operation:

The guide trough (not shown) delivers cigarettes 203 into successive flutes 204 at the receiving station A while the corresponding ports 216 are disconnected from the suction fan. Therefore, the cigarettes advance over and beyond the ports 216 and are gradually brought to a full stop by the median portion of the leaf spring 271 extending into those flutes 204 which travel past and beyond the station A. The cigarettes whose lengthwise movement is terminated move sideways beyond the spring 271 and the corresponding ports 216 are then connected to the suction fan by way of conduit 231, groove 222 and channels 221. The braked position of a cigarette (in the first predetermined region of the respective flute 204) is indicated in FIG. 7 by phantom lines. When it reaches the second predetermined region of its flute, the cigarette assumes the solid-line position of FIG. 7. The apparatus of FIG. 7 may further include an orifice for compressed air (corresponding to orifice 39 of FIG. 2) and a second sealing member (corresponding to orifice 39 of FIG. 2) and a second sealing member (corresponding to the plate 41 of FIG. 1).

Figure 8:
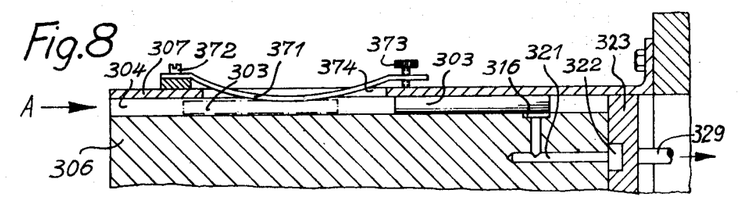
FIG. 8 is a similar fragmentary longitudinal vertical sectional view of a fourth apparatus.

FIG. 8 shows a portion of an apparatus which constitutes a modification of the apparatus shown in FIGS. 4 to 6. The braking device comprises a leaf spring 371 which engages with and terminates lengthwise movement of cigarettes 303 ahead of the corresponding suction ports 316. The parts of the apparatus shown in FIG. 8 are denoted by numerals similar to those employed in FIG. 7 plus 100. A cigarette 303 which enters the illustrated flute 304 of the drum 306 at the receiving station A is braked by the median portion of the leaf spring 371 and is brought to a full stop with reference to the drum. The port 316 is thereupon connected with the suction conduit 329 by way of the channel 321 and groove 322 and causes the cigarette 303 to leave its phantom line position (in the first region of the flute 304) and to assume its final position shown by solid lines (in the second region of the flute).

Figure 9:
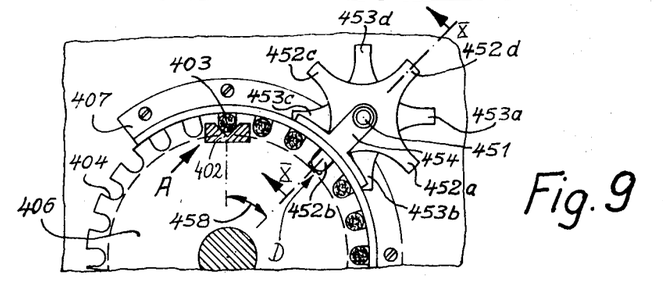
FIG. 9 is a fragmentary end elevational view of a fifth apparatus, substantially as seen in the direction of arrow IX in FIG. X.
Figure 10:
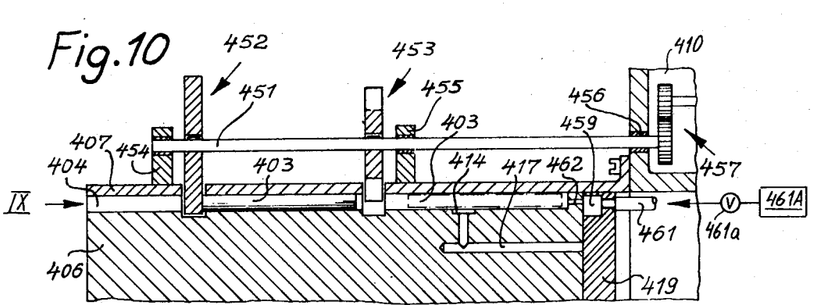
FIG. 10 is a fragmentary longitudinal sectional view as seen in the direction of arrows from the line X-X of FIG. 9.

FIGS. 9 and 10 illustrate a further modification of the apparatus which is shown in FIGS. 1 to 3. The drum 406 of this apparatus comprises a single group of openings 414, one for each of the flutes 404 and each located close to the right-hand axial end of the drum, as viewed in FIG. 10. The apparatus further comprises mechanical locating means or stops 452, 453 and a pneumatic device which shifts the cigarettes 403 from the first into the second regions of the respective flutes 404. The stops 452, 453 resemble paddle wheels which are fixed to a common shaft 451 and are respectively provided with substantially radially extending arresting members or arms 452a–452d and 453a–453d. The shaft 451 is driven by a transmission 457 in synchronism with the drum 406 in such a way that the arms 452b, 453b, 452a, 453a, 452d, 453d, 452c, 453c extend into successive flutes 404 at the time when the corresponding orifices 462 of the drum 406 register with a plenum chamber of groove 459 in a valve plate 419. The chamber 459 is connected with a compressor 461A by a conduit 461. The station D where the arms of stops 452, 452 extend into successive flutes 404 is located past the receiving station A, as viewed in the direction of a rotation of the drum 406. The angle between the stations A and D is denoted by the numeral 458. The brackets 454, 455 for the shaft 451 are secured to the shroud 407. The shaft 451 extends through a bearing 456 in the wall 410. The openings 414 are connected with a fan by way of channels 417 and a groove (not shown) in the valve plate 419 when the corresponding flutes 404 travel from the station A toward the station D.

The apparatus of FIGS. 9 and 10 is designed to form two files of cigarettes 403. If the row of cigarettes delivered by the trough 402 is to be converted into a single file of cigarettes which move sideways, the stop 452 or 453 can be dispensed with. However, the remaining stop is then provided with a larger number of arms or is rotated at a higher speed to insure that an arm always extends into that flute which reaches the station D. FIG. 10 shows that the shroud 407 is provided with cutouts for the arms of the stops 452, 453.

The trough 402 delivers cigarettes 403 into successive flutes 404 at the receiving station A. Such cigarettes are drawn to the phantom-line positions (one shown in FIG. 10) by currents of air which are sucked into the corresponding openings 414. The respective orifices 462 are then out of registry with the chamber 462 but the corresponding channels 417 are in communication with the suction conduit (not shown) while the cigarettes 403 travel sideways from the station A and close to the station D. The channel 417 for the opening 414 in that flute which accommodates a cigarette 403 in phantom-line position (first region of the flute) is then disconnected from the suction fan and the corresponding orifice 462 begins to communicate with the chamber 459 so that the cigarette is blown rearwardly and reaches the second region of the corresponding flute 404 in which it abuts against one arm of the stop 452 or 453. These stops insure that the cigarettes form two files before they reach the discharging station (not shown). The conduit 461 is preferably provided with a pressure regulating valve 461a which can be adjusted to insure that the pressure of air which is admitted by way of orifices 462 is not excessive, i.e., that the cigarettes are not deformed by and/or cannot rebound on impact against the arms of the respective stops.

The currents of air drawn into the openings 414 between the stations A and D can be assisted by an accelerator which is adjacent to the trough 402 and propels successive cigarettes toward the station A.

Figure 11:
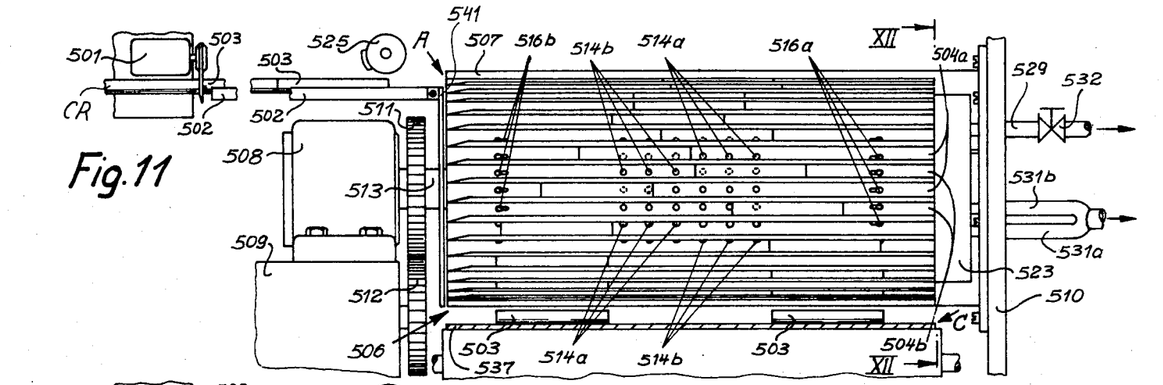
FIG. 11 is a side elevational view of a sixth apparatus.
Figure 12:
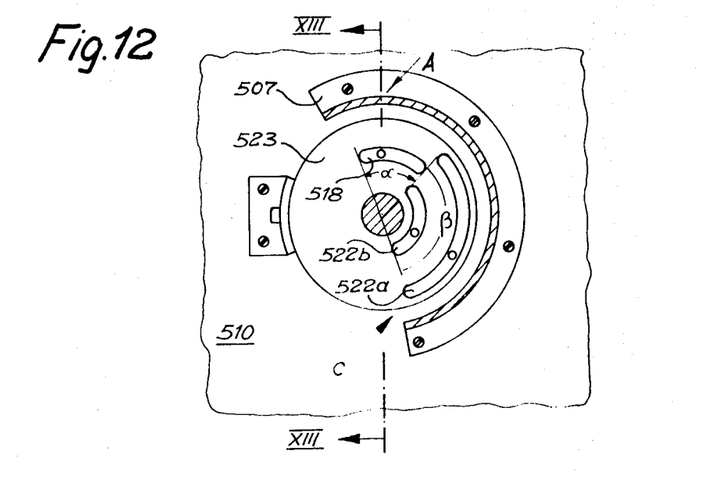
FIG. 12 is a transverse vertical sectional view as seen in the direction of arrows from the line XII-XII of FIG. 11.
Figure 13:
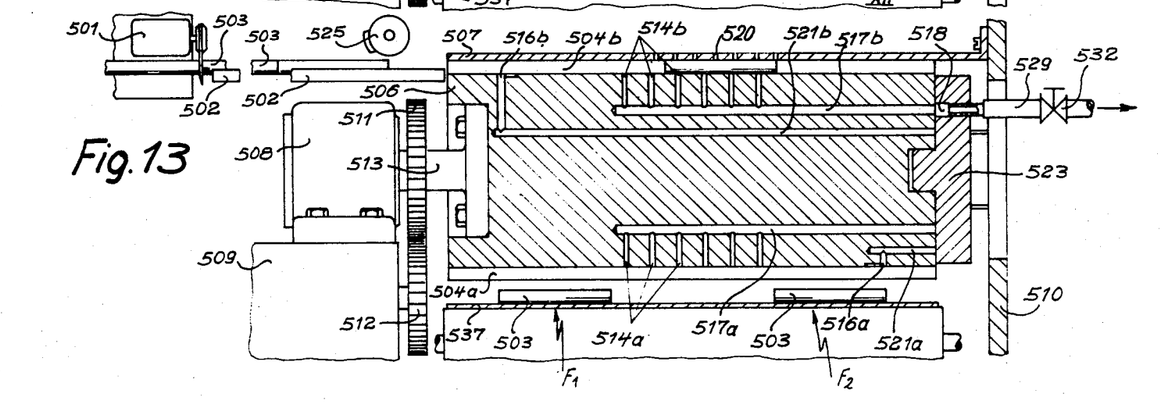
FIG. 13 is a longitudinal vertical sectional view as seen in the direction of arrows from the line XIII—XIII of FIG. 12.

Referring finally to FIGS. 11 to 13, there is shown a further transporting apparatus which is designed to convert a single row of cigarettes 503 which are delivered by a guide trough 502 into two files F1, F2 of cigarettes which move sideways on the upper stretch of an endless belt 537. The drum 506 is provided with flutes 504a and with additional flutes 504b which alternate with the flutes 504a. Each flute 504a communicates with a set of suction openings 514a which are provided substantially midway between the axial ends of the drum 506 and with a suction port 516a which is adjacent to the right-hand axial end of the drum, as viewed in FIG. 11 or 13. Each flute 504b communicates with a set of openings 514b located midway between the axial ends of the drum and with a suction port 516b close to the left-hand axial end of the drum. The openings 514a, 514b respectively communicate with axially parallel bores or channels 517a, 517b of the drum 506 which communicate with an arcuate suction groove 518 of a disk-shaped valve plate 523 when they travel from the receiving station A toward to the front ends of two additional arcuate grooves 522a, 522b in the valve plate 523. The channels 521a for the suction ports 516a can communicate with the suction groove 522a and the channels 521b for the ports 516b can communicate with the groove 522b. The groove 518 is connected to the suction side of a fan 529A by a suction conduit 529 which contains an adjustable valve 532. The grooves 522a, 522b are connected with the branches 531a, 531b of a second suction conduit 531 which also contains a regulating valve (not shown) and is connected with the fan 529A or with a separate fan. FIGS. 11–13 further show the cutoff 501, the accelerating cam 525a which is driven in synchronism with the drum 506, the wall 510, shaft 513, gears 511, 512, the baring 508, transmission case 509, and the sealing members 507, 541.

The operation:

The cutoff 501 severs the cigarette rod CR to form cigarettes 503 which travel in the trough 502 and are accelerated by the lobe of the cam 525 so that each thereof, enters the station A when the latter registers with the left-hand end of an empty flute 504a or 504b. Such flute is then substantially sealed from the atmosphere by the shroud 507. The openings 514a and 514b of the flute 504a or 504b are connected with the groove 518 of the valve plate 523 when such flute travels past and beyond this station A so that the cigarette 503 is drawn toward and is caused to travel into the first region of the corresponding flute in which it overlies the openings 514a or 514b. The cam 525 constitutes an optional feature of my apparatus because the control unit including the means for drawing currents of air through the openings 514a, 514b is capable of moving the cigarettes 503 into the first regions of the corresponding flutes 504a or 504b without assistance from mechanical accelerating means. The ports 516a, 516b are disconnected from the grooves 522a, 522b while the corresponding flutes 504a or 504b travel past and beyond the station A, i.e., while the corresponding openings 514a or 514b communicate with the groove 518. When a flute 504a or 504b which contains a cigarette 503 covers an angle alpha (FIG. 13), the corresponding port 516a or 516b communicates with the groove 522a or 522b and produces a current of air which pulls the cigarette from the first region into the second region of the respective flute. The currents of air entering the ports 516a pull the cigarettes in a first direction, namely, in the same direction in which the cigarettes travel from the station A toward the first regions of the respective flutes 504a, and the currents of air entering the ports 516b pull cigarettes counter to such direction, i.e., toward the left-hand axial end of the drum 506, as viewed in FIG. 11 or 13. In this way, the flutes 504a, 504b accumulate two files F1, F2 which are deposited on the upper stretch of the belt 537 and can be assembled with filter rod sections of double unit length to form therewith filter cigarettes of double unit length. The belt 537 can be replaced by a fluted drum or by a chain with pockets or holders for cigarettes 503. Also, the cutoff 501 can be designed to sever a continuous filter rod which yields filter rod sections of unit length or multiple unit length which are thereupon transported by the drum 506 to form two files corresponding to the files F1 and F2. This also applies for the apparatus which are shown in FIGS. 1 to 10.

Figure 14:
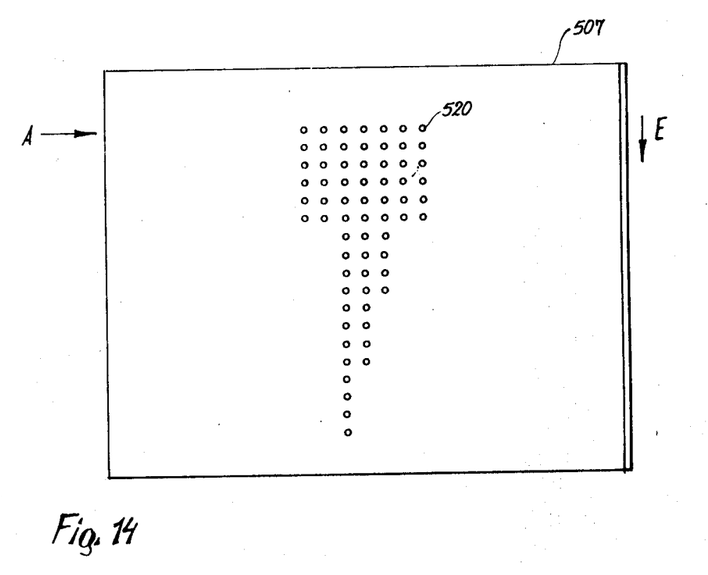
FIG. 14 is a developed view of a sealing member in the apparatus of FIGS. 11-13.

FIG. 14 shows the shroud 507 in developed view. This shroud is formed with rows of perforations or small apertures 520. The shroud extends from a point located at least slightly ahead of the station A to a point located ahead of the discharging station C. The first row of perforations 520 is in line with the receiving station A (indicated in FIG. 14). The arrow E denotes the direction of sidewise travel of cigarettes 503 in the flutes 504a and 504b. The purpose of perforations 520 is to admit auxiliary currents of air when the openings 514a or 514b communicate with the suction groove 518 of the valve plate 519 whereby such auxiliary currents of air assist the pneumatic braking device of the control unit in safely transferring cigarettes 503 into the first regions of the respective flutes. Such auxiliary currents of air prevent further acceleration of cigarettes which travel toward the openings 514a or 514b of the respective flutes. The braking action is smoother and more gradual due to the provision of perforations 520. When the ports 516a, 516b communicate with the grooves 522a, 522b currents of air entering the corresponding flutes 504a, 504b by way of the perforations 520 assist the displacing unit in rapidly and accurately locating the cigarettes in the second regions of their flutes.

An important advantage of the apparatus shown in FIGS. 11 to 13 is that the openings 514a are located at the same distance from the station A as the openings 514b. This insures that each cigarette is subjected to the same braking action during travel in its flute toward a position of rest prior to lengthwise movement to its final position. Such distribution of openings 514a, 514b reduces the likelihood of jamming at the station A because the accelerating action of the cam 525 can assist a predictable and reproducible accelerating action of air currents which are drawn into the openings 514a, 514b during travel of corresponding flutes 504 past the groove 518. Another important advantage of the just described apparatus is that the braking action can be completed rapidly, i.e., while the corresponding flutes travel through a small angle alpha. This is due to the fact that each flute is provided with a row of openings 514a or 514b which insure rapid braking action, especially if the shroud 507 is provided with the perforations 520. Therefore, a relatively long interval of time remains available for transfer of cigarettes from the first into the second regions of their flutes (see the angle beta in FIG. 13). Accurate positioning of cigarettes 503 in their final positions is facilitated by auxiliary air currents which are drawn through the perforations 520 when the ports 516a or 516b of the corresponding flutes 504a or 504b communicate with the groove 522a or 522b.

All embodiments of my apparatus share the common advantage that the accelerator 525 is not absolutely necessary because the cigarettes can be caused to advance into the first regions of their flutes in response to suction which is produced in such flutes when they travel past and beyond the receiving station A. Furthermore, the operation of the improved apparatus is not unduly influenced by changes in the rate at which the station A receives cigarettes from the guide means. With the exception of the apparatus shown in FIGS. 9 and 10, the means for displacing and locating the cigarettes in their final positions (in the second regions of the corresponding flutes) need not include mechanical stops so that the likelihood of deformation of and/or damage to the cigarettes is very remote. However, the apparatus of FIGS. 9 and 10 is also capable of forming a single file or two files of cigarettes without damage to their wrappers and/or fillers because the pneumatic braking device can rapidly arrest the cigarettes in the first regions of their flutes so that a relatively weak stream of compressed air (orifices 462) suffices to shift the cigarettes 403 to their final positions.

An advantage which is common to those apparatus wherein the cigarettes move in a first direction during travel toward the first regions of their flutes and thereupon move counter to such direction during travel to their final positions is that the braking action is gradual because the pneumatic or mechanical braking devices can gradually decelerate the cigarettes to zero speed. Experiments which were carried out with the transporting apparatus of my invention have shown that the apparatus may employ relatively short drums, even if the cigarettes are delivered at a very high speed.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

1. In an apparatus for transporting cigarettes, filter rod sections and analogous rod-shaped articles, a combination comprising conveyor means having elongated flutes which move sideways; guide means for directing articles lengthwise into said flutes; control means for regulating movements of articles lengthwise of said flutes in a given direction so as to insure that the articles come to rest in first predetermined regions of respective flutes; and displacing means for thereupon moving the articles lengthwise of said flutes counter to said given direction to locate such articles in second predetermined regions of respective flutes.

2. A combination as defined in claim 1, wherein said conveyor means comprises a rotary drum and said flutes are provided in the periphery and extend in parallelism with the axis of said drum, and further comprising sealing means partially surrounding said drum to at least substantially seal some of said flutes from the atmosphere.

3. A combination as defined in claim 1, wherein said control means comprises braking means for articles in said flutes.

4. A combination as defined in claim 1, wherein said conveyor means comprises additional flutes which move sideways and receive articles from said guide means, and further comprising second control means for regulating movements of articles lengthwise of said additional flutes in said given direction so as to insure that the articles come to rest in first predetermined regions of respective additional flutes, and second displacing means for thereupon moving articles lengthwise of said additional flutes in said given direction to locate such articles in second predetermined regions of said additional flutes.

5. A combination as defined in claim 4, wherein said additional flutes alternate with said first mentioned flues.

6. A combination as defined in claim 1, wherein said control means comprises pneumatic braking means.

7. A combination as defined in claim 6, wherein said conveyor means has openings in communication with said flutes and said braking means comprises means for conveying through said openings currents of air which increase friction between the articles and said conveyor means to thereby arrest articles in the first predetermined regions of said flutes.

8. A combination as defined in claim 1, wherein said control means comprises mechanical braking means.

9. A combination as defined in claim 1, wherein said control means comprises adjustable braking means for increasing friction between the articles in said flutes and said conveyor means and means for adjusting said braking means.

10. A combination as defined in claim 1, wherein said control means comprises braking means operative to increase friction between articles in said flutes and said conveyor means for variable intervals of time and adjusting means for selecting the length of said intervals.

11. A combination as defined in claim 1, wherein said displacing means comprises current generating means for producing in said flutes currents of air which move the articles to said second regions of respective flutes.

12. A combination as defined in claim 11, wherein said conveyor means is provided with suction ports communicating with said flutes and said current generating means comprises means for drawing said air currents by suction from said flutes into the respective ports.

13. A combination as defined in claim 12, wherein said displacing means further comprises valve means for connecting said current generating means with said ports when the articles come to rest in the first regions of respective flutes.

14. A combination as defined in claim 1, wherein said displacing means comprises means for producing in said flutes currents of air which move the articles from first toward second regions of such flutes and mechanical stop means arranged to enter the flutes during movement of articles therein from the first toward the second regions to thus arrest the articles in final positions.

15. A combination as defined in claim 14, wherein said stop means comprises a plurality of discrete arresting members movable in a predetermined sequence into successive flutes of said conveyor means.

16. A combination as defined in claim 14, wherein said means for producing air currents comprises a source of compressed air and means for admitting compressed air into flutes by way of orifices provided in said conveyor means.

17. A combination as defined in claim 1, further comprising sealing means for substantially sealing from the atmosphere those flutes which accommodate rod-shaped articles, said sealing means having at least one perforation for admission of air currents into such flutes.

18. In an apparatus for transporting cigarettes, filter rod sections and analogous rod-shaped articles, a combination comprising conveyor means having elongated flutes which move sideways; guide means for directing articles lengthwise into said flutes; control means for including pneumatic braking means for regulating movements of articles lengthwise of said flutes in a given direction so as to insure that the articles come to rest in first predetermined regions of respective flutes; sealing means for at least substantially sealing from the atmosphere those articles which occupy said first regions of respective flutes; and displacing means for thereupon moving the articles by suction lengthwise of said flutes in said given direction to locate such articles in second predetermined regions of respective flutes.

19. A combination as defined in claim 18, wherein said pneumatic braking means comprises means for drawing currents of air by suction from said flutes to thereby move articles toward and to arrest such articles in the first regions of respective flutes.

20. A combination as defined in claim 19, wherein said control means further comprises means for adjusting said braking means.